United States Patent [19]

Andrejasich et al.

[11] Patent Number: 4,835,521
[45] Date of Patent: May 30, 1989

[54] FLUID STATUS DETECTOR

[75] Inventors: Raymond J. Andrejasich, Carmel; Laurence S. Slocum, Indianapolis, both of Ind.; Bruce A. Clarkson, Beverly, Mass.

[73] Assignee: Emhart Industries, Inc., Indianapolis, Ind.

[21] Appl. No.: 116,787

[22] Filed: Nov. 5, 1987

[51] Int. Cl.⁴ .................. G08B 19/00; G01M 3/32
[52] U.S. Cl. ........................ 340/521; 73/49.2
[58] Field of Search ............ 340/521, 605, 522; 73/61.1 R, 291, 292, 49.2 T

[56] References Cited

U.S. PATENT DOCUMENTS

| | | | |
|---|---|---|---|
| 4,646,069 | 2/1987 | Andrejasich | 340/603 |
| 4,736,193 | 4/1988 | Slocum et al. | 340/522 |
| 4,740,777 | 4/1988 | Slocum et al. | 340/522 |

Primary Examiner—Stewart J. Levy
Assistant Examiner—Joseph W. Roskos
Attorney, Agent, or Firm—Carl A. Forest

[57] ABSTRACT

There is a controller connected to a plurality of probes via a transmission line. The controller provides a command signal including a probe identifier signal and a probe data signal. Each probe includes a plurality of different sensors, each providing one or more status signals on a plurality of probe data channels. Each probe also includes a comparator for comparing the probe identifier signal to a local probe address, a multiplexer responsive to the data signal for selecting one of the data channels, and a switch responsive to the comparator to provide the selected data signal to the controller when the identifier signal correlates with the local probe address.

6 Claims, 11 Drawing Sheets

PROBE IDENTIFIER    DATA WORD

FLUID STATUS DETECTOR

FIELD OF THE INVENTION

The invention in general relates to fluid status detectors, such as those which detect fluid leaking from tanks, and in particular a detector having a probe communication system that enables a wide variety of different fluid conditions to be monitored from a central location.

DESCRIPTION OF THE PRIOR ART

U.S. Pat. No. 4,221,125, on an invention of John N. Oliver and Louis M. Sandler and U.S. Pat. No. 4,116,045 on an invention of Bronson M. Potter, are exemplary of systems for detecting the presence of fluid pollutants. Such systems typically involve detection probes that are buried or otherwise placed in the region of possible sources of pollutants, such as gasoline storage tanks. The probes are connected via wires to a central controller which monitors the probe status. It is well known in the field that it is important to place a multiplicity of probes about such possible pollution sources so that leakage from any portion of the source and flowing in any direction will be quickly detected. In recent systems other probes have been placed between the walls of double-walled tanks. The present invention further contemplates that probes may also be placed in the tank to measure the level of fluid, probes may be located in fluid lines to measure fluid flow, and other probes may measure the status of other fluid parameters.

U.S. Pat. No. 4,646,069 issued to Raymond J. Andrejasich et al and U.S. Pat. No. 4,088,985 issued to Mitsuru Saito et al describe fluid detection systems in which each probe in a multiple-probe system is identified by a stored probe address. The controller sequentially transmitts identifier numbers, and the probes report the fluid status sensed when the number corresponding to their address is transmitted. The Saito Patent further describes a system in which the status signals of many identical probes are stored in a single register, and the register's content is reported to the controller as a block when the local probe address is received.

SUMMARY OF THE INVENTION

It is an object of the invention to provide a fluid status detector in which the probe response may be tailored to individual probes.

It is a further object of the invention to provide a fluid status detector which overcomes many disadvantages of the prior art systems, and is more flexible than the prior art system, and at the same time is simpler and less expensive to manufacture than the prior art systems.

It is a further object of the invention to provide one or more of the above objects in a fluid status detector that may employ a wide variety of different probes.

The invention provides a fluid detector of the type comprising a controller, a plurality of probes for sensing the status of fluids at probe locations remote from the controller, and a transmission line connecting said controller and said probes, wherein the controller comprises a controller output, a controller input, means for providing a command signal to the controller output, and a means responsive to signals received at said controller input for providing an indication of the fluid status at the probe locations; the probes each comprising: sensing means for providing a plurality of status signals representative of one or more fluid conditions and for applying the status signals to a plurality of probe data channels, a probe input, and a probe output; the transmission line connecting the controller output to the probe input and the controller input to the probe output, wherein the command signal comprises a probe identifier signal representative of a particular one of the probes and a probe data signal representative of a particular one of the probe data channels; and wherein each of the probes further comprises: means for storing a local probe address; means for comparing the probe identifier signal to the local probe address, selecting means responsive to the data signal for selecting one of the data channels, and means communicating with the means for comparing for providing a signal corresponding to the signal on the selected data channel to the probe output when the identifier signal correlates with the local probe address.

Preferably, the plurality of probes comprises a first probe including a first sensing means for sensing one or more first fluid conditions and a second probe including a second sensing means for sensing one or more second fluid conditions, at least one of the second fluid conditions being a different condition than any of the conditions sensed by the first sensing means. Preferably the first sensing means includes a fluid level sensor, a plurality of temperature sensors and a water-hydrocarbon sensor, and said second sensing means includes a liquid-gas sensor.

The fluid status detector of the present invention decreases the complexity and cost of the detector compared to the prior art detectors while significantly expanding the power of the system to monitor fluid status. Numerous other features, objects and advantages of the invention will become apparent from the following detailed description when read in conjunction with the accompanying drawings.

DESCRIPTION OF THE PREFERRED EMBODIMENT

Figure 1:
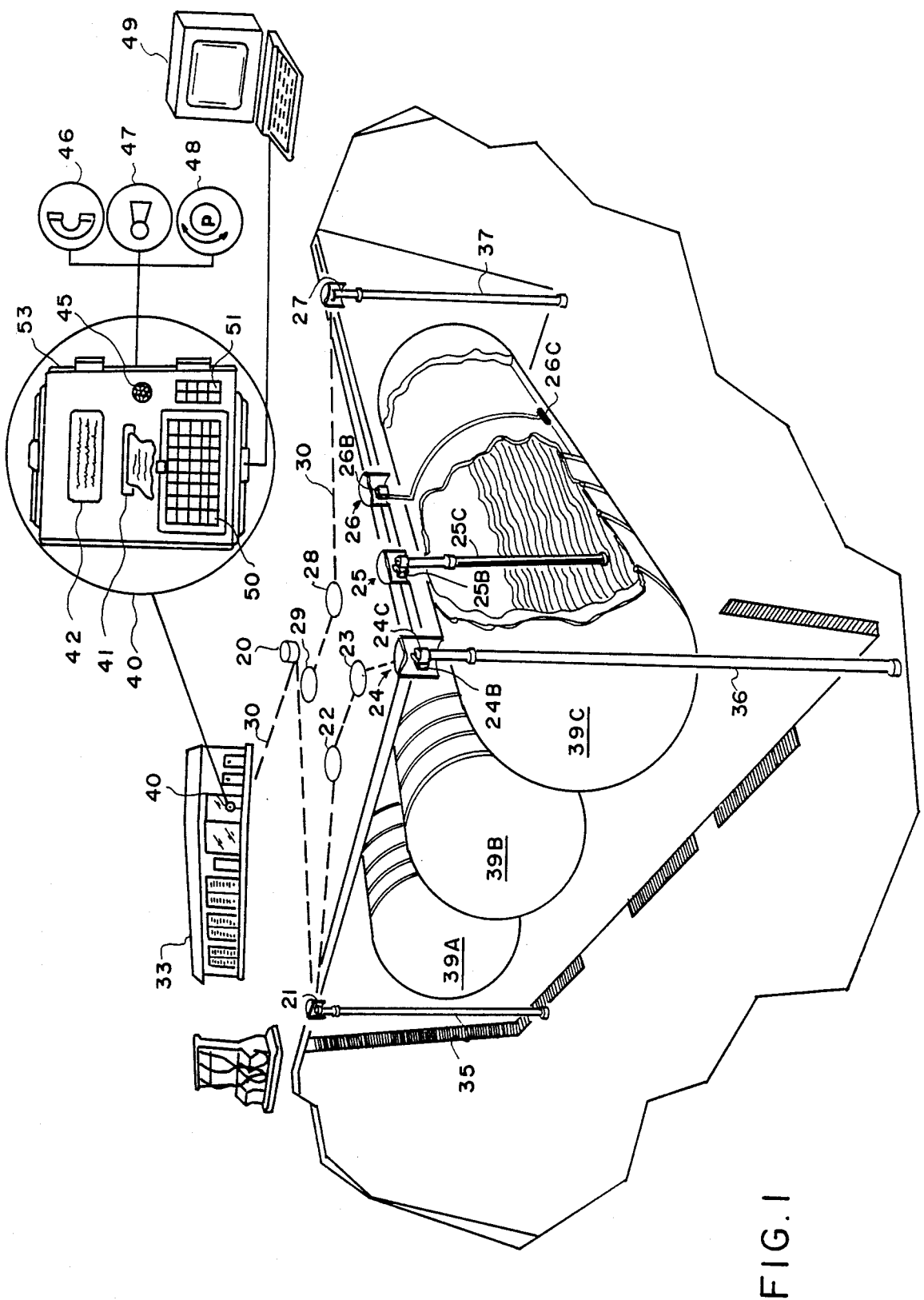
FIG. 1 is a diagramatic view of a preferred embodiment of a fluid status detector according to the invention in a typical operating environment.
Figure 3:
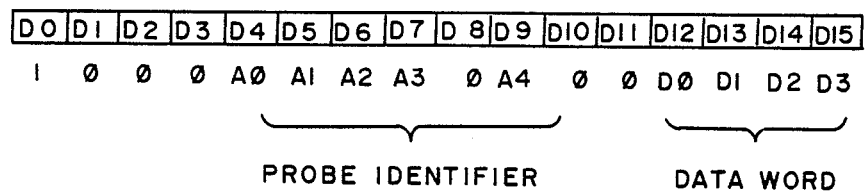
FIG. 3 shows a preferred format for a digital command output by the controller.

FIG. 1 illustrates the preferred embodiment of the invention as it may be installed at a gasoline station. A plurality of probes 20 through 29 detect the status of their environment and provide signals over transmission line 30 to a controller 40 which would generally be located in the service building 33. Some probes, such as 21, 24 and 27 may extend down wells 35, 36 and 37, respectively, external to gasoline tanks 39A, 39B and 39C. Some, such as 26, may be extended between the walls of a double-walled tank, such as 39C. Others, such as 25, may extend inside the tanks to measure the liquid level in the tanks. The invention contemplates that other types of probes may also be used. The controller 40 transmits a command signal comprising a probe identifier signal and a data signal, as shown in FIG. 3. The command signal is decoded within probe communication module 20B (see FIG. 4) and the data signal is passed to the selecting means 134, which in the preferred embodiment comprises a multiplexer, via lines 148. (See FIGS. 9 and 10.) Sensors such as 130, 131, 132, 140 and 141 provide status signals to multiplexer 134 over channels 136 and 146. The multiplexer 134 selects a channel and applies the signal on it to one of voltage to frequency converters 135, 147, the outputs of which are applied to the probe output −SO, through the communications module 20B switch 63 when the identifier signal agrees with the local probe address applied to decoder 60.

Upon receiving the status of the probes, the controller provides an indication of the probe status which may take the form of a message on printer 41 or liquid crystal display 42, an alarm on audio alarm 45, an external alarm via phone 46 or speaker 47 or a report on an external data terminal 49. Or the status report could trigger a pump 48 to remove leaking pollutants. Keyboards 50 and 51 on controller 40 may be used to input data, commands and otherwise communicate with the system.

Figure 2:
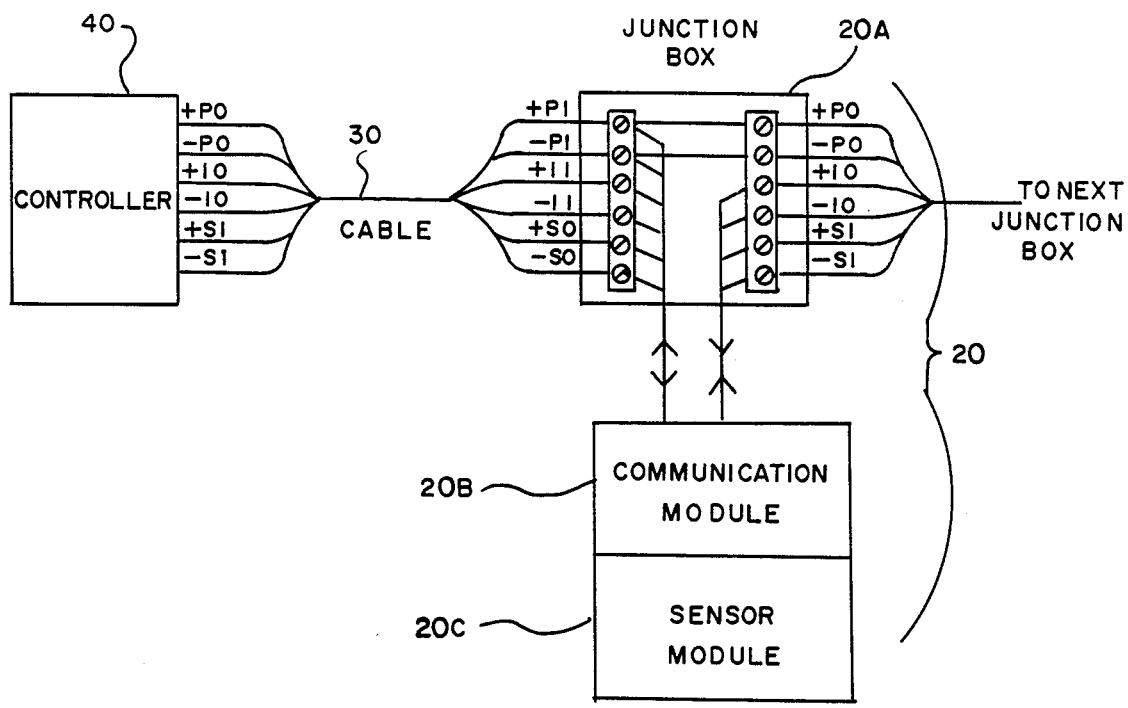
FIG. 2 is a block diagram showing in detail the interconnection of the controller and probes shown in the embodiment of FIG. 1.

Turning now to a more detailed description of the preferred embodiment of the invention, FIG. 2 shows the interconnection between the probes and the controller. The controller 40 is connected to the probes via a transmission line 30 which in the preferred embodiment is a six-wire cable. Each probe, such as 20, preferably includes a junction box, such as 20A, a communication module, such as 20B, and a sensor module, such as 20C. Preferably the junction box (20A) and the communication module (20B) are identical for each probe. The sensor module may be a fluid sensor in a well such as 35 (FIG. 1), a liquid level sensor such as 25C, a between-the-wall fluid sensor, such as 26B, a vapor sensor or any one of a number of different fluid status sensors. Examples of such sensors are described below in reference to FIGS. 9-13. Communications modules are shown at 24B, 25B and 26B in FIG. 1. The junction boxes are not shown in FIG. 1 as the scale is not sufficient to show them clearly. The junction box and the communication module will be discussed in terms of the junction box 20A and communication module 20B associated with the first probe 20, although it is understood that these portions are the same for all probes. The preferred communication module is discussed below with reference to FIGS. 2, 4 and 5. The controller includes a positive power output terminal (+PO), a negative power output terminal (−PO), a positive identifier signal output terminal (+IO), a negative identifier signal output terminal (−IO), a positive status signal input terminal (+SI), and a negative status signal input terminal (−SI). The junction box 20A includes, at the left, positive and negative input power terminals (+PI, −PI), positive and negative identifier signal input terminals (+II, −II), positive and negative status signal output terminals (+SO, −SO) each of which are connected to the corresponding terminal on the controller (+PI to +PO, −PI to −PO, +IO to +IO, etc.). On the right the junction box includes positive and negative power output terminals (+PO, −PO), positive and negative identifier signal output terminals (+IO, −IO) and positive and negative status signal input terminals (+SI, −SI) which are connected to the corresponding terminals on the next junction box (+PO to +PI, −PO to −PI, +IO to +II, −IO to −II, +SI to +SO and −SI to −SO). The junction box terminals are connected to the communication module as will be clear from the discussion of FIGS. 4 and 5.

In the preferred embodiment the identifier signal is part of a 16-bit digital Manchester encoded command sent by the controller 40 to the probes. The format for this command is shown in FIG. 3. The first four bits and the eleventh and twelvth bits are fixed. A0 through A4 represent the identifier signal. Up to 32 probes may be addressed by these 4 bits. D0 through D3 represent a data word which may be used to control the sensor module. This word may be used to address one of sixteen data channels.

Figure 4:
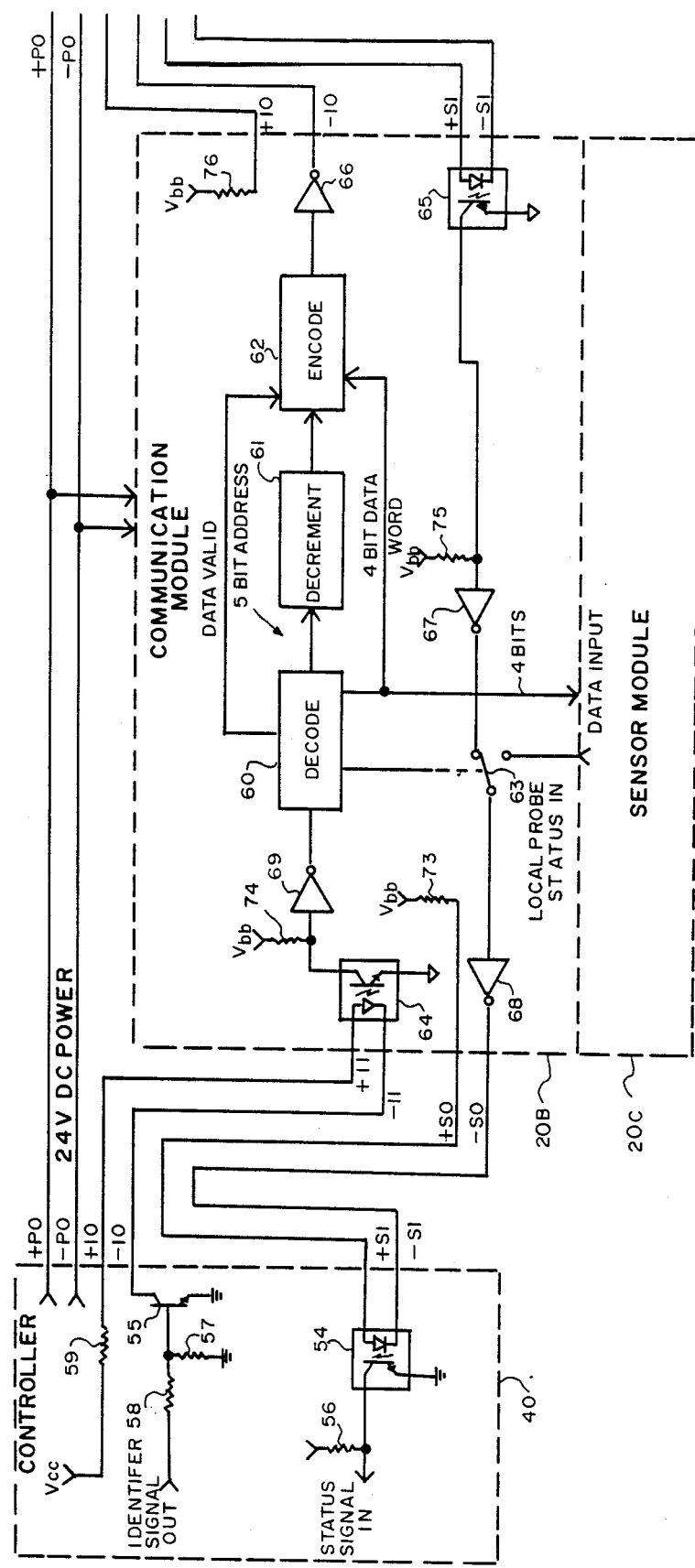
FIG. 4 is a block circuit diagram of the detector communications network of the embodiment of FIG. 1.

FIG. 4 shows a block circuit diagram of the system communication network. The communication network portions of the controller include optocoupler 54, transistor 55 and resistors 56, 57, 58 and 59. Resistor 59 is connected between the Vcc internal power source (an approximately 5 volt power supply) of the controller and +IO output terminal. The collector of transistor 55 is connected to the −IO output terminal. The emitter of transistor 55 is connected to ground and the base is connected to ground through resistor 57 and to the identifier signal (digital word) output through resistor 58. The positive status signal input terminal (+SI) is connected to the anode of the optocoupler diode, and the negative status signal input terminal (−SI) is connected to the cathode. The emitter of the optocoupler is connected to ground while the collector is connected to the Vcc power supply through resistor 56 and to the status signal input.

The communication module includes decode circuitry 60, decrement circuitry 61, encode circuitry 62, optocouplers 64 and 65, inverters 66, 67, 68 and 69 and resistors 73, 74, 75 and 76. The identifier signal input terminals +II and −II are connected across the optocoupler 64 diode with the positive connected to the anode and the negative connected to the cathode. The emitter of optocoupler 64 is connected to the probe ground and the collector is connected to the probe power supply Vbb (an approximately 5 volt power source) through resistor 74 and the input of inverter 69. The output of inverter 69 is connected to the input of the decode logic 60. The decode logic compares the 5-bit probe identifier address A0 through A4 to the local address; and if it matches it, places a signal on the select (sel) output which is applied to switch 63 to cause it to switch to the local probe status in line. The identifier address is sent to decrement logic 61 where it is decremented by one and passed to the encode logic 62. If the identifier address matches the local address, a signal is also placed on the select output to cause switch 63 to switch to the status signal probe input. The data word D0 through D3 is passed to the encode logic and to the sensor module data input. The decode logic also checks the digital data word for validity, and if it is valid, it places a signal on the data valid output which is applied to the encode logic 62 to cause it to apply the encoded signal to the input of inverter 66. The output of inverter 66 is connected to the −IO terminal. The +IO terminal is connected to the Vbb power source through resistor 76. The +SI terminal is connected to the anode of the optocoupler 65 diode and the −SI terminal to its cathode. The emitter of the optocoupler 65 is connected to ground and the collector is connected to the Vbb source through resistor 75 and to the input of inverter 67. The output of inverter 67 is connected to the status signal probe input of switch 63. The output of switch 63 is connected to the input of inverter 68. The output of inverter 68 is connected to the −SO terminal, and the +SO terminal is connected to the Vbb power source through resistor 73.

Figure 5:
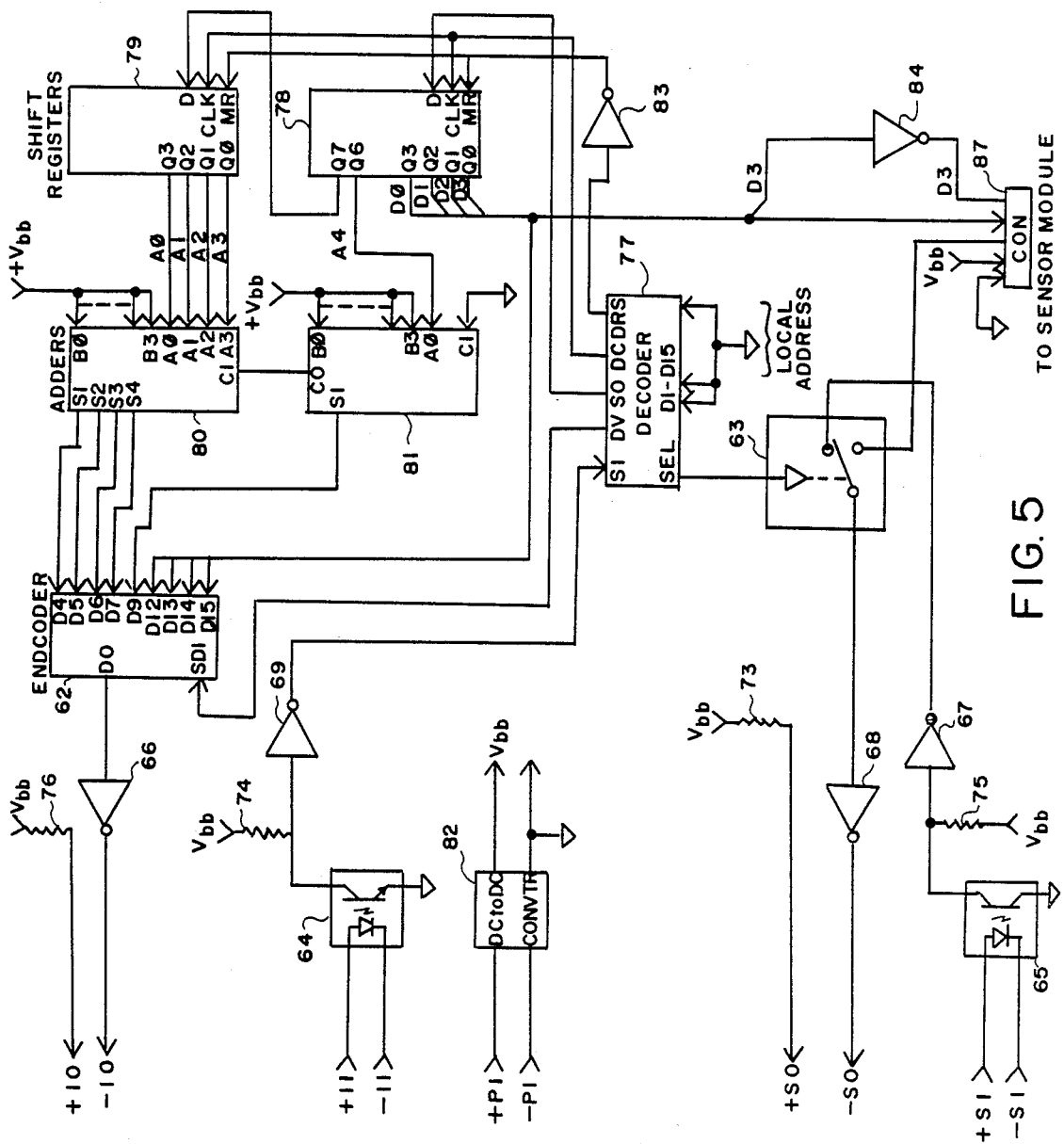
FIG. 5 is a detailed electrical circuit diagram of the communication module of the probes of FIG. 1.

FIG. 5 is a detailed electrical circuit diagram of the communications module. In addition to the parts discussed in reference to FIG. 4, the circuit includes a DC to DC converter 82, and inverters 83 and 84. The decode logic 60 and decrement logic 61 are implemented together using decoder 77, shift registers 78 and 79 and adders 80 and 81. The encode logic comprises encoder 62. The +PI and −PI inputs are connected to a DC to DC converter which provides isolation of the probe power supply. The DC to DC converter also permits an input voltage of 24VDC. This higher distribution voltage reduces the current drain of each probe on the distribution system, thereby reducing the IR losses in the transmission line 30, allowing the use of more probes. The outputs of the converter 81 provide the probe power source Vbb and the probe ground. The numbers within the rectangles representing the IC chips 77, 78, 79, 80, 81 and 62 indicate the inputs/outputs of those chips which are explained in the literature provided with the particular chips (see below). The output of inverter 69 is connected to the SI input of decoder 77. The DV output of decoder 77 is connected to the SDI input of encoder 62. The SO and DC outputs of decoder 77 are connected to the D and CLK inputs respectively of shift register 78. The DC output is also connected to the CLK input of shift register 79. The DRS output of decoder 77 is connected to the MR inputs of shift registers 78 and 79 through inverter 83. The D1 through D15 inputs of decoder 77 are connected to ground. The Q7 output of shift register 78 is connected to the D input of shift register 79 while the Q6 output is connected to the A0 input of adder 81. The Q0 through Q3 outputs of shift register 78 are connected to the D12 through D15 inputs of encoder 62 and also to the sensor module terminal block 87 with the D3 (Q0) line being inverted by inverter 84. The Q0 through Q3 outputs of shift register 79 are connected to the A3 through A0 inputs respectively of adder 80. The B0 through B3 inputs of adders 80 and 81 are connected to the Vbb voltage source. The S1 through S4 outputs of adder 80 are connected to the D4 through D7 inputs respectively of encoder 62. The C1 input of adder 81 is grounded. The C0 output of adder 81 is connected to the C1 input of adder 80 while the S1 output is connected to the D9 input of encoder 62. The D0 output of encoder 62 is applied to the input of inverter 66. The sensor module ground and voltage source inputs are connected to the communications module ground and voltage source, Vbb, respectively through terminal block 87. The other connections are as discussed in reference to FIG. 4.

In the preferred embodiment, encoder 62 is a Manchester coder/decoder Supertex type ED9, adders 80 and 81 are 4-bit adders National Semiconductor type 74HC283, shift registers 78 and 79 are RCA type CD74HC164, decoder 77 is a Supertex type ED5 Manchester coder/decoder, optocouplers 54, 64 and 65 are Texas Instruments type TIL153's, transistor 55 is a type PN2222, the inverters 66 through 69 and 83 and 84 are a National Semiconductor Schmitt hex inverter type 74HC14, DC to DC converter 81 is a 24 volt to 5 volt converter, resistors 57, 59, 73, and 76 are 1K ohm, 58 is a 2K ohm resistor, resistors 56, 73, 74 and 75 are 10K ohm, and switch 63 is a quad multiplexer type CD74HC157 from RCA.

Figure 6:
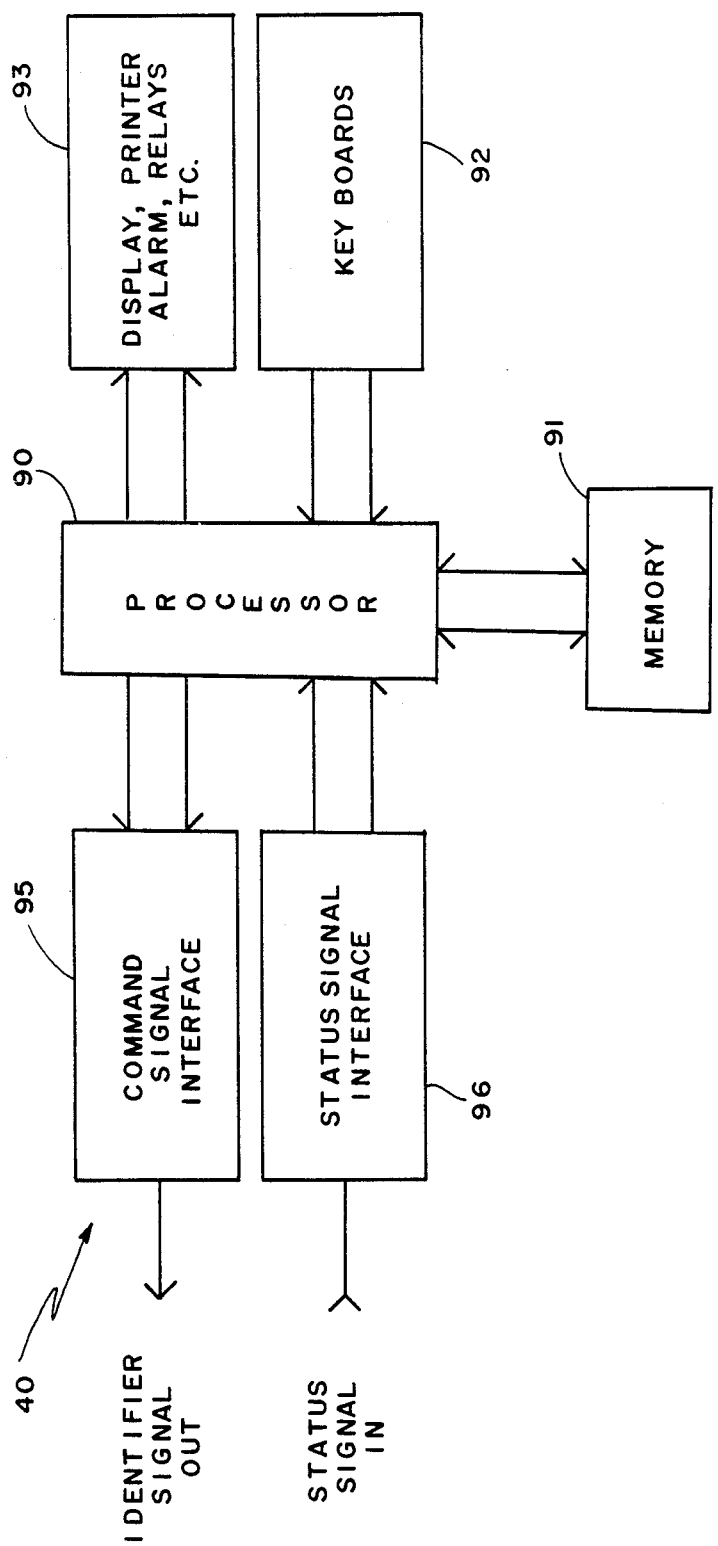
FIG. 6 is a block circuit diagram of the controller of FIG. 1.

FIG. 6 shows a block circuit diagram of the preferred embodiment of the controller 40. It comprises a processor 90, a memory 91, keyboards 92, outputs 93, command signal interface 95 and status signal interface 96. The processor receives instruction from keyboards 92 and input from status signal interface 96 and utilizes stored programs from memory 91 to activate appropriate outputs via display 42, printer 41, alarm 45, (FIG. 1) etc. to provide an indication of the probe status. The processor 90, memory 91, keyboards 92 and outputs 93 may be any one of a number of such components that are well-known in the art; as for example the processor, memory, keyboards, displays, etc. described in U.S. Pat. Nos. 4,736,193 and 4,740,777 on inventions of Laurence S. Slocum and Sara M. Mussmann for Programmable Fluid Detectors. Thus, these components will not be discussed further herein. The command signal interface and status signal interface are, however, unique in the field of fluid detectors and therefore will be described in detail.

Figure 7:
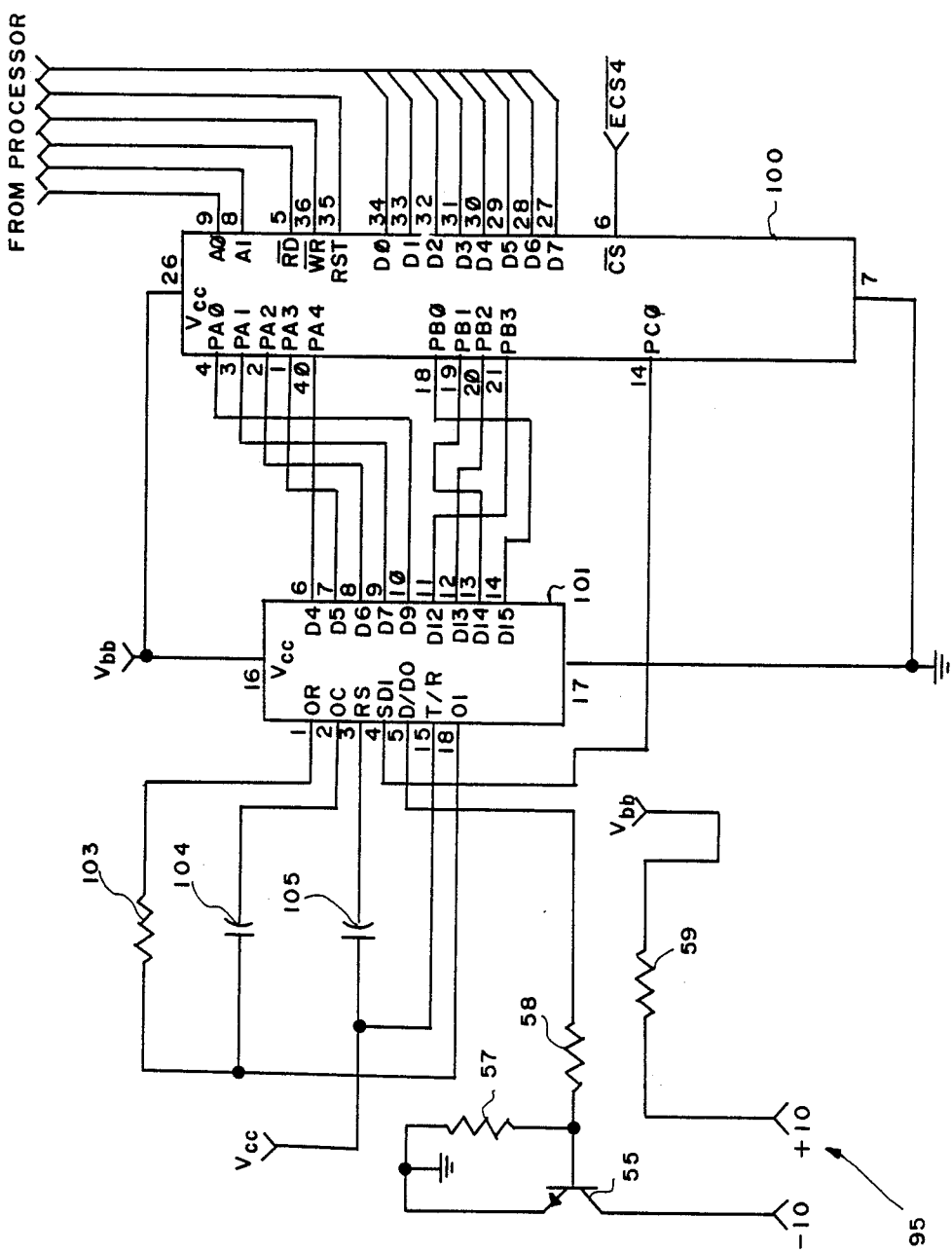
FIG. 7 is a detailed circuit diagram of the controller output signal interface shown in FIG. 6.

FIG. 7 shows the detailed circuit diagram for the command signal interface 95. It comprises parallel interface adapter 100, transmitter 101, resistors 103, 57, 58 and 59, and capacitors 104 and 105. The numbers on the integrated circuits, such as parallel interface adaptor 100, near the connecting lines refer to the pin numbers of the circuits, while the letters in the interior refer to the internal signals. The numbers 5, 8, 9 and 27 through 36 pins of the parallel interface adapter are connected to the data and timing outputs of the processor as appropriate to transmit the probe address and sensor module data. The number 6 pin is connected to the device enable circuitry associated with the processor. The number 1 through 4 pins of adapter 100 are connected to the 7 through 10 pins respectively of transmitter 101. The number 40 pin of adapter 100 is connected to the number 6 pin of transmitter 101. The number 18 through 21 pins of adapter 100 are connected to the 14 through 11 pins respectively of transmitter 101. The number 14 pin of adapter 100 is connected to the number 4 pin of transmitter 101. The number 3 pin of transmitter 101 is connected to the system voltage source, Vcc, through capacitor 105, and the number 15 pin is also connected to the Vcc voltage. The number 18 pin of transmitter 101 is connected to the number 2 pin through capacitor 104 and the number 1 pin through resistor 103. The number 16 pin of transmitter 101 and the number 26 pin of adapter 100 are connected to the Vcc voltage and the number 17 pin of transmitter 101 and the number 7 pin of adapter 100 are connected to ground. The number 5 pin of transmitter 101 provides the output command signal to the probes which is also the Identifier Signal Output shown in FIG. 4.

The command signal interface circuit 95 works as follows. The parallel interface adapter 100 is connected to the processor and other elements of the circuit so as to provide the probe address (identifier signal) on its A0 through A4 outputs and the sensor data signal on its B0 through B3 outputs. Pin 14 of the adapter 100 strobes the transmitter 101 when the identifier signal and sensor signal is at the adapter outputs and transmitter 101 then transmitts the signal as a Manchester encoded serial digital signal on output pin 5. The circuit comprising transistor 55 and resistors 57 and 58 is a buffer circuit, while the circuit comprising resistor 103 and capacitors 104 and 105 is an RC clock which provides the timing for transmitter 101. In the preferred embodiment parallel interface adapter 100 is a type 82C55A and transmitter 100 is a type ED-9 Manchester transmitter while resistor 103 is 40K ohms and capacitors 104 and 105 are 1,000 picofarads and 100 picofarads respectively which provide a 10K hertz timing signal.

Figure 8:
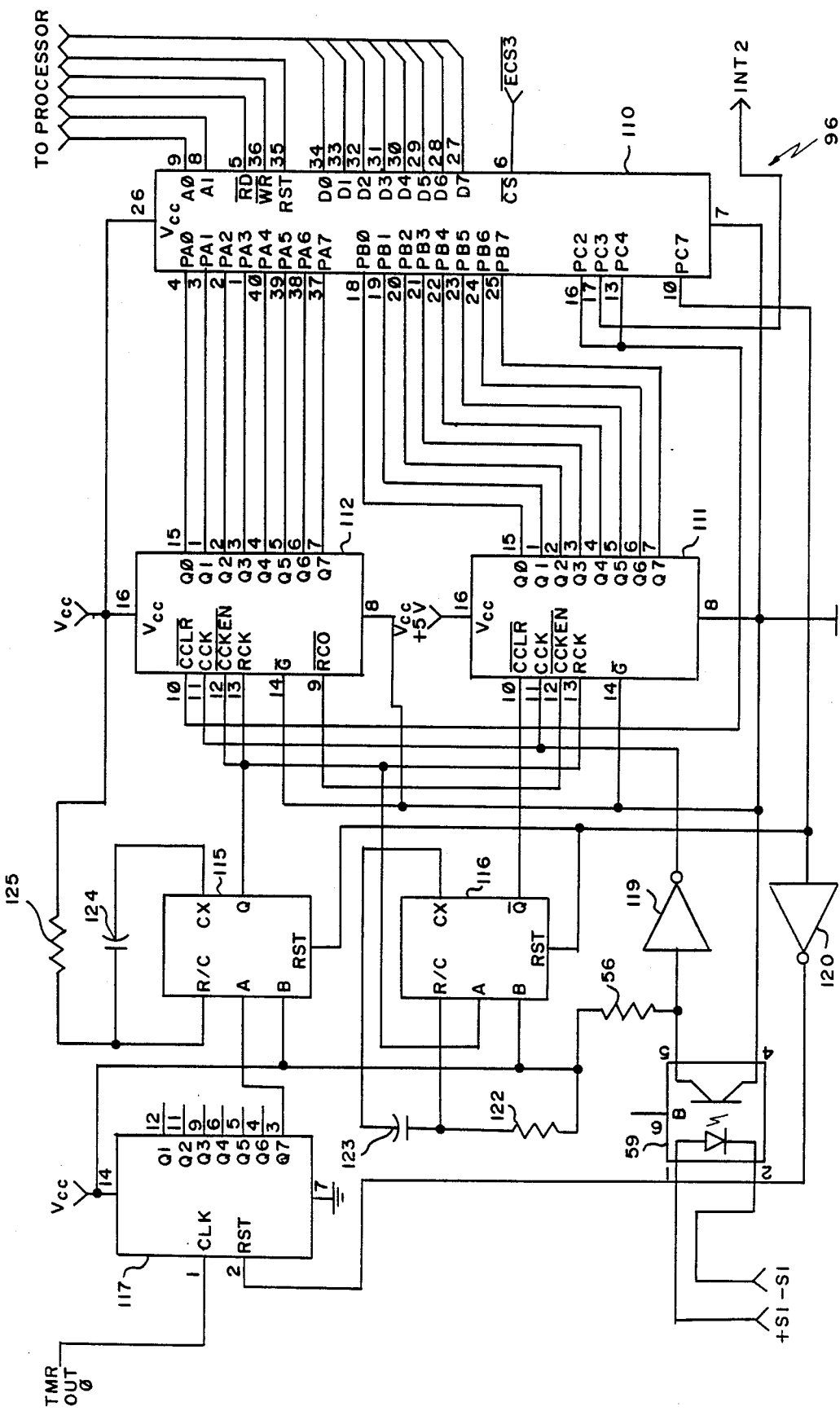
FIG. 8 is a detailed circuit diagram of the controller input signal interface shown in FIG. 6.

Turning now to FIG. 8, the detailed circuitry for the status signal interface 96 is shown. It includes parallel interface adapter 110, counters 111 and 112, one-shot latches, 115 and 116, counter 117, Schmitt-trigger inverters 119 and 120, resistors 56, 122 and 125 and capacitors 123 and 124. The numbers 5, 8, 9, 17, and 27-36, pins of adapter 110 are connected to the processor 90 and the number 6 pin is connected to the chip select circuitry associated with processor 90. The number 26 pin of adapter 110 is connected to the Vcc voltage, while the number 7 pin is connected to ground. The 1 through 7 pins of counter 112 are connected to the 3, 2, 1, 40, 39, 38 and 37 pins respectively of adapter 110. The number 15 pin of counter 112 is connected to the number 4 pin of adapter 110, while the number 15 pin of counter 111 is connected to the number 18 pin of adapter 110. The number 1 through 7 pins of counter 111 are connected to the 19 through 25 pins respectively of adapter 110. The number 13 and 16 pins of adapter 110 are connected to the Q output of latch 116. The number 10 pin of adapter 110 is connected to the reset inputs of latches 115 and 116 and to the input of inverter 120. The number 16 pins of counters 111 and 112 are connected to the Vcc voltage while their number 8 and 14 pins are connected to ground. Their number 10 pins are each connected to the Q output of latch 116, their number 11 pins to the output of inverter 119, and their number 13 pins to the Q output of latch 115. The number 12 pin of counter 112 is also connected to the Q output of latch 115 while the number 12 pin of counter 111 is connected to the number 9 pin of counter 112. The CX output of latch 115 is connected to its R/C input through capacitor 124, while the CX output of latch 116 is connected to its R/C input through capacitor 123. The R/C input of latch 115 is also connected to the Vcc voltage through resistor 125 while the R/C input of latch 116 is also connected to Vcc through resistor 122. The B inputs of latches 115 and 116 are connected to the Vcc voltage. The A input of latch 115 is connected to the Q7 output (number 3 pin) of counter 117 while the A input of latch 116 is connected to the Q output of latch 115. The number 14 pin of counter 117 is connected to Vcc while its number 7 pin is grounded. The clock input (number 1 pin) of counter 117 is connected to the processor timer function, TMROUTO. The reset input of counter 117 is connected to the output of inverter 120. The input of inverter 119 is connected to the number 5 pin of optoisolator 54, which provides the Status Signal In signal shown in FIG. 4.

The status signal interface operates as follows: After processor 90, as described above in reference to FIG. 7, sends a command to a probe asking for its status, it waits a time long enough for the command to go out along the probe communication network and the probe that was addressed to report the status requested. It then addresses the parallel interface adapter 110 causing it to strobe the reset inputs of the counter 117 and latches 115 and 116. This causes the latches to turn on the counters 111 and 112 to begin reading the frequency coming in on the +SI input terminal and counter 117 to begin clocking a time period over which the frequency will be read. The time is controlled by the processor via the TMROUTO function. If the processor is asking for a status that requires a high resolution reading of the SI signal coming in, it will put a low frequency signal as TIMROUTO, and if it is asking for a status that requires a low resolution reading, it will put a higher frequency signal as TMROUTO. The counter 117 will then count for a predetermined number of counts which define length of time period over which the SI signal will be read. When counter 117 times out, it activates the one-shots 115 and 116 which shut down the counters 111 and 112. The processor then tells the parallel interface adapter 110 to read the count of counters 111 and 112, which are connected to operate as a single 16 bit connector, which the adapter does and reports the count read back to the processor 90. It then signals the processor it is finished via the INT2 signal output on pin 17.

In the preferred embodiment, parallel interface adapter 110 is a type 82655A, counters 111 and 112 are each type 74HC590 eight-bit counters, latches 115 and 116 are type 74HC221, counter 117 is a 74HC4020, inverters 119 and 120 are 74HC14's, resistors 122 and 125 are each 2 K ohms and capacitor 123 and 124 are each 1000 picofarads.

Figure 9:
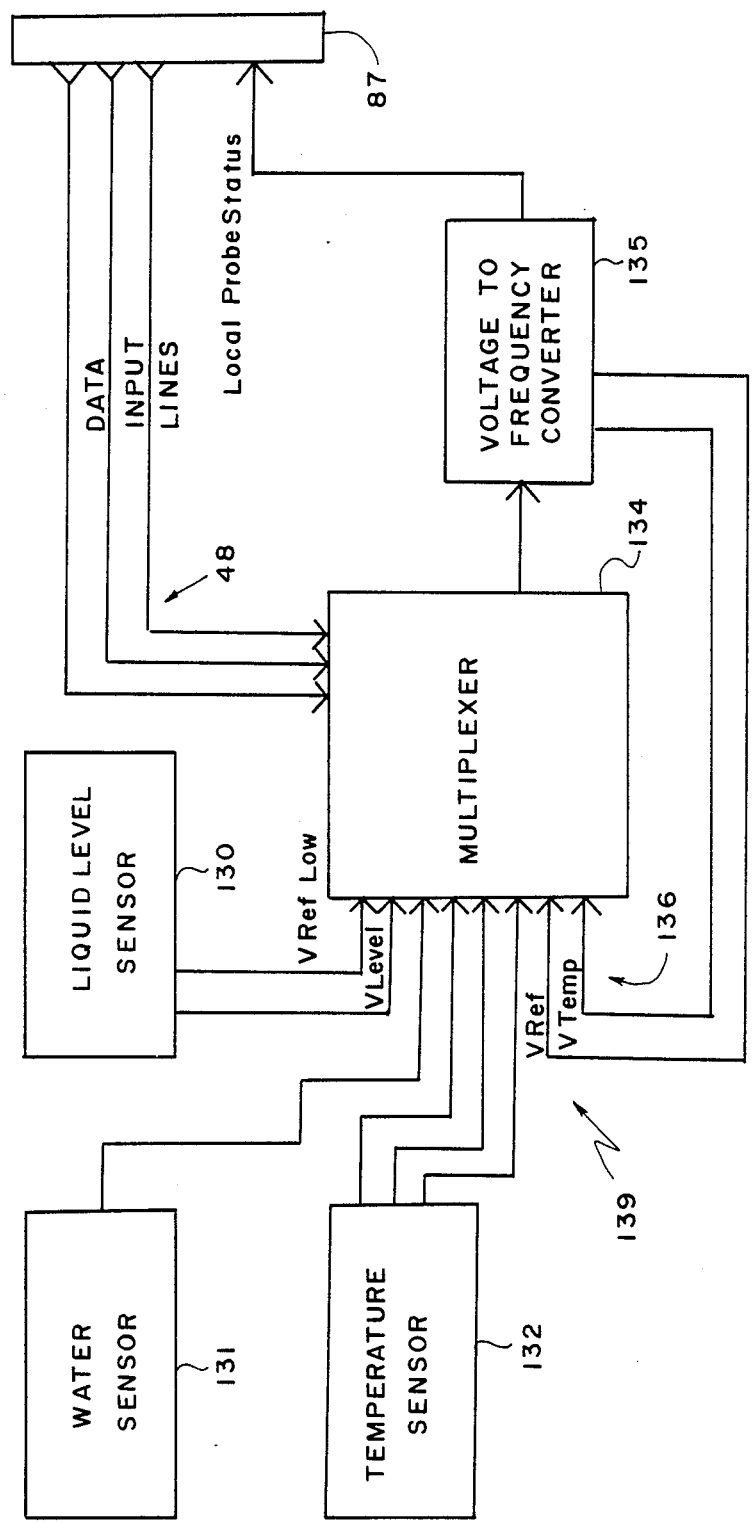
FIG. 9 is a block diagram of a fluid level sensor module according to the invention.

Turning now to the description of an exemplary sensor module, FIG. 9 shows a block circuit diagram of a fluid level sensor, such as 25C. This module includes a fluid level sensor 130, a water/hydrocarbon sensor 131, temperature sensors 132, multiplexer 134, and voltage to frequency converter 135. Each of the sensors 130, 131, and 132 apply voltage signals to multiplexer 134. The data input lines 148 from terminal block 87 are also connected to multiplexer 134. Responding to the data signals on lines 148 which orginated in the controller 40, the multiplexer places on converter 135 the voltage corresponding to the status requested by the controller. Converter 135 converts the voltage to a frequency signal which is the status signal, and outputs the status signal to the local probe status terminal of terminal block 87.

Figure 10:
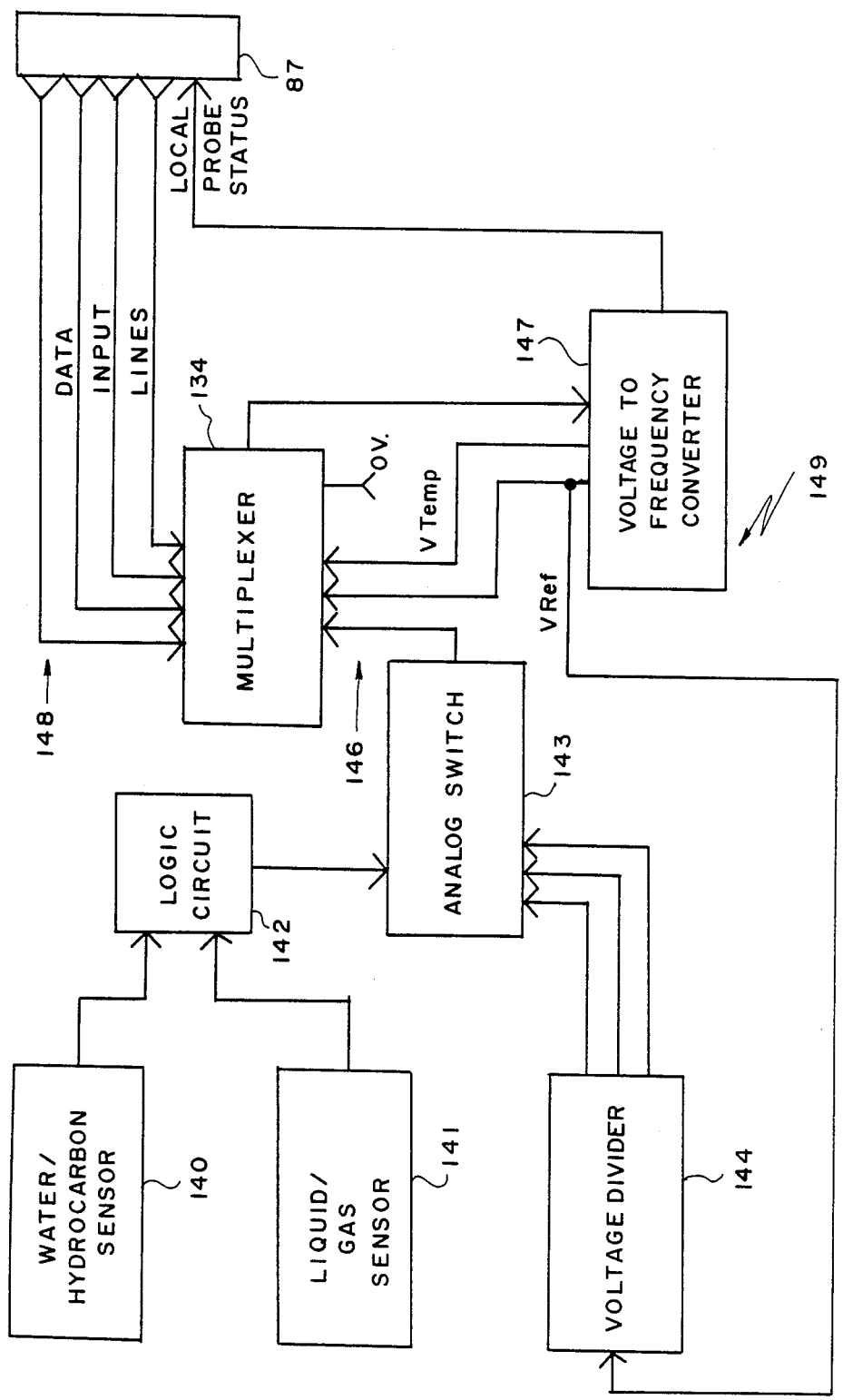
FIG. 10 is a block diagram of a fluid sensor module according to the invention.

FIG. 10 shows a block electrical circuit diagram of another exemplary sensor module, a sensor intended to be placed in a well, such as 35 (FIG. 1), and which differentiates between water, hydrocarbon and air. This module includes a water/hydrocarbon sensor 140, a liquid/gas sensor 141, logic circuit 142, analog switch 143, voltage divider 144, multiplexer 134, and voltage to frequency converter 147. The sensors 140 and 141 each apply voltage signals to logic circuit 142 which determines if hydrocarbon, water or air is present and applies a signal indicative of which is present to analog switch 143. Voltage divider 144 employing a reference voltage level from converter 147, generates three analog voltage levels which are applied to switch 143. Switch 143 applies one of the voltage levels, which is determined by the input from logic circuit 142, to multiplexer 134. The data signal from controller 40 is applied to multiplexer 134 via data input lines 148. Converter 147 also applies a temperature signal indicative of the temperature of the IC chip to multiplexer 134. In response to the data command from controller 40 and using a reference voltage from voltage to frequency converter 147, multiplexer 134 places one of the voltages provided by the divider 144 or the temperature signal voltage to converter 147 which converts it to a frequency signal and applies this signal to the local probe status terminal of terminal block 87.

Figure 11:
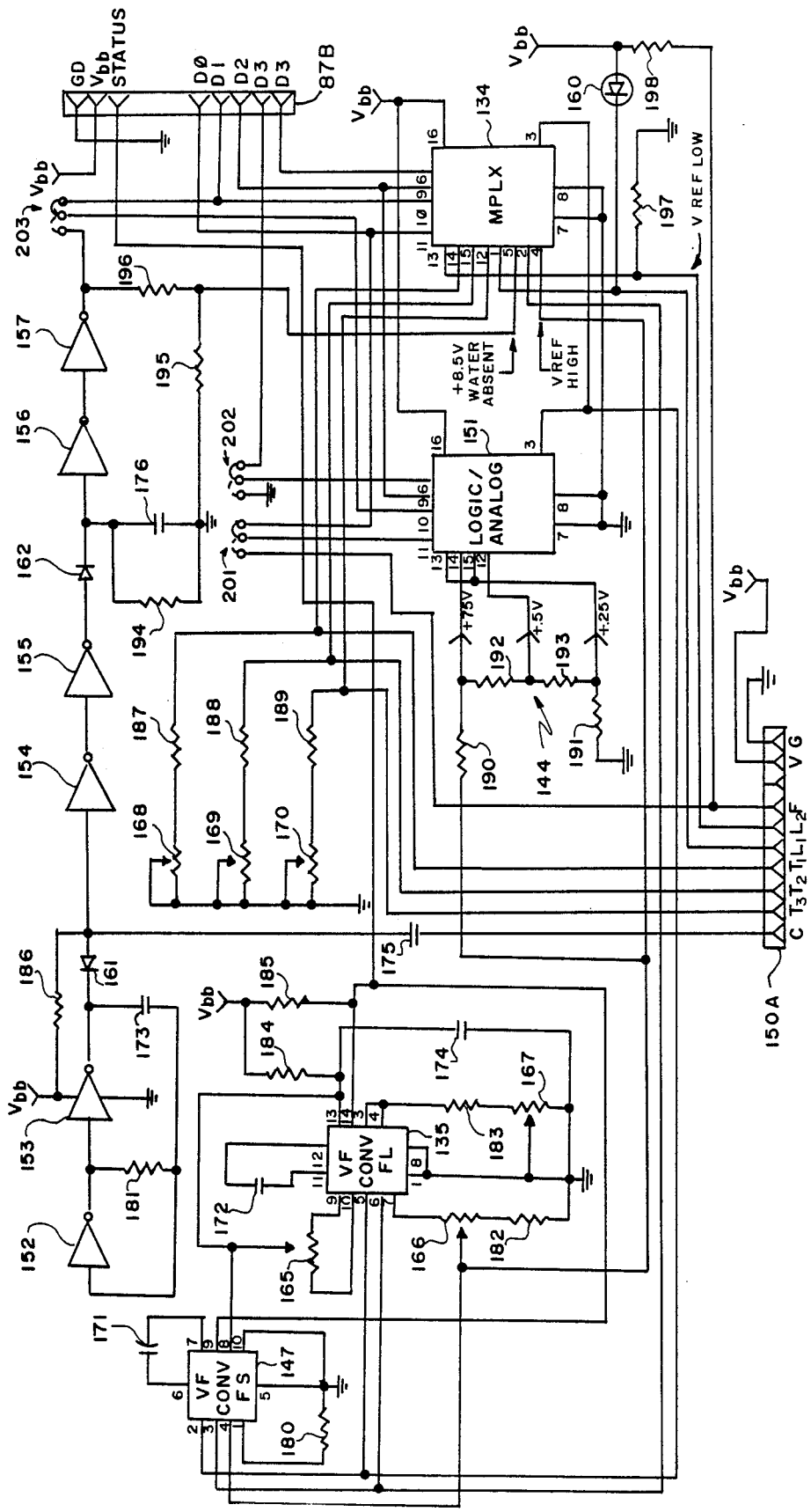
FIG. 11 is a detailed electrical circuit diagram of the preferred sensor module circuit board.

In the preferred embodiment of the invention, the fluid level sensor module of FIG. 9 and the fluid sensor module of FIG. 10 are implemented on a single circuit board which is shown in FIG. 11. Different circuits are connected on the board and different components are connected to the board via terminal block connector 150A to provide the two different sensor modules. The components that are connected to terminal block 150A to form the fluid level sensor of FIG. 9 are shown in FIG. 12, while the components that are connected to the terminal block 150A to form the fluid sensor module of FIG. 10 are shown in FIG. 13.

Figure 12:
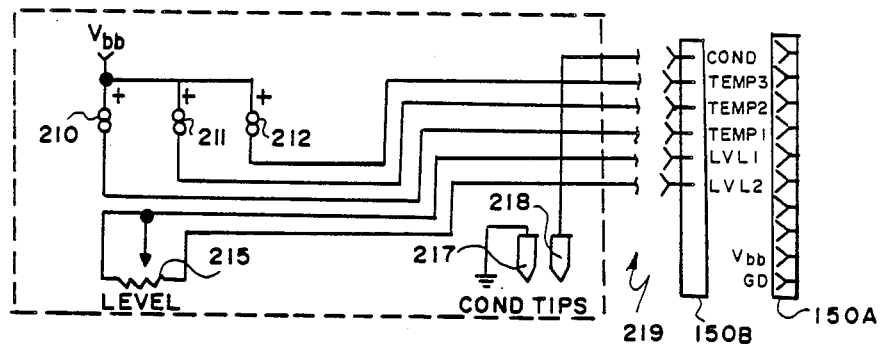
FIG. 12 shows the sensor elements which are connected to the circuit board of FIG. 11 to form the sensor module of FIG. 9.

Referring to FIG. 12 in the preferred embodiment the sensor for the fluid level module comprises temperature sensors 210, 211, 212, liquid level sensor 215, conducting electrode tips 217 and 218 and connector 150B. The temperature sensors 210, 211 and 213 are preferably located at different depths of tank 39C, the level sensor is mounted vertically in the tank, and the conducting tips 217 and 218 are located at or near the bottom of the tank. The wires 219 connect the sensor and the connector 150B which plugs into converter 150A in the probe sensor module circuit board located at the top of probe sensor module 25C.

Figure 13:
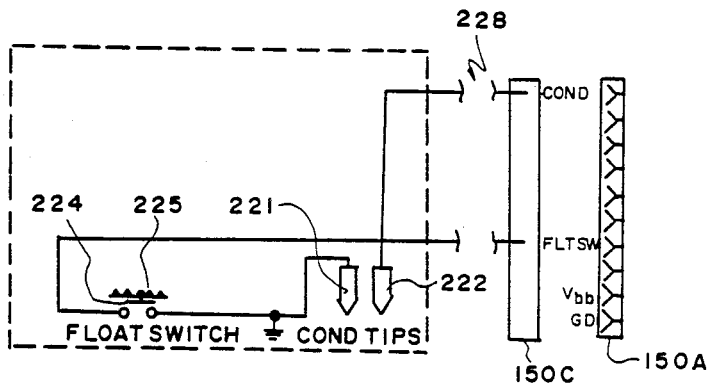
FIG. 13 shows the sensor elements which are connected to the circuit board of FIG. 11 to form the sensor module of FIG. 10.

Referring to FIG. 13, the fluid sensor module sensors include conducting electrode tips 221 and 222 and switch 224 which is activated by the movement of a float 225 shown schematically. The fluid sensor is preferably located in a well such as 35 outside the tank with the float 225 free to move up and down the well 35 with the liquid level and the conducting tips 221 and 222 mounted in the float so that they extend into the liquid. The float switch 224 and the conducting tips 221 and 222 are connected by wires 228 to connector 150C which plugs into connector 150A mounted on the circuit board located near the top of the well.

A detailed electrical circuit diagram of the preferred sensor module circuit board is shown in FIG. 11. The circuit includes multiplexer 134, logic/analog switch I.C. 151 which functions both as logic circuit 142 and analog switch 143, voltage to frequency converter 135, voltage to frequency converter 147, inverters 152 through 157, constant current diode 160, diodes 161 and 162, potentiometers 165 through 170, capacitors 171 through 176, resistors 180 through 198, jumpers 201, 202, 203, and connectors 87B and 150A. The GD or ground pin of connector 87B connects to the board system ground while the Vbb pin connects to the system voltage line. The status pin connects to the number 9 pin of converter 147, the number 14 pin of converter 135 and the Vbb voltage through resistor 185. The DO data input of connector 87B connects to the number 11 pin of multiplexer 134 and the number 11 pin of logic/switch 151 through jumper 201. Note that the solid line on jumpers 201, 202 and 203 indicates the connection for the level sensor module of FIG. 9, while the dotted line indicates the connection for the fluid sensor module of FIG. 10. Logic/switch 151 and converter 147 are not required for the level sensor module of FIG. 9 and may be omitted in the boards for the module, while converter 135 is not required for the fluid sensor module of FIG. 10 and may be omitted in boards intended for that module. Data input D1 is connected to pin 10 of multiplexer 134 and to pin 10 of logic/switch 151 through jumper 203. Data input D2 is connected to pins 9 of multiplexer 134 and logic/switch 151. Data input D3 is connected to the number 6 pin of logic/switch 151 through jumper 202, while data input D3 is connected to pin 6 of multiplexer 134. The conducting tip input pin C of connector 150A is connected to the input of inverter 154 and the anode of diode 161 through capacitor 175; the input of inverter 154 is also connected to the Vbb voltage through resistor 186. Inverters 152, etc. are a hex inverter chip, the voltage input of which is connected to the Vbb voltage and the ground of which is grounded. The output of inverter 153 is connected to the input of inverter 152 through capacitor 173, while the output of inverter 152 is connected to the input of inverter 153 and also is connected to its own input through resistor 181. The output of inverter 153 is connected to the cathode of diode 161 and the anode of the diode is connected to the input of inverter 154. The output of inverter 154 is connected to the input of inverter 155, and the output of inverter 155 is connected to the anode of diode 162. The cathode of diode 162 is connected to the input of inverter 156, to ground through capacitor 176, and also to ground through resistor 194. The output of inverter 156 is connected to the input of inverter 157. The output of inverter 157 is connected to the number 5 pin of multiplexer 134 through resistor 196, and the same pin is also connected to ground through resistor 195. The output of inverter 157 is also connected to pin 10 of logic/switch 151 through jumper 203 in the fluid sensor module embodiment. One side and the adjustable contact of each of potentiometer 168, 169 and 170 is connected to ground while the other side is connected to pins 14, 15 and 12 respectively of multiplexer 134 through resistors 187, 188 and 189 respectively; pins 14, 15 and 12 are also connected to the numbers 1, 2, and 3 temperature inputs (T1, T2 and T3) of connector 150A. The level 1 input, L1, of connector 150A is connected to the number 1 pin of multiplexer 134 and to the Vbb voltage through constant current diode 160, with the cathode of the diode toward the level 1 input. The level 2, L2, input of connector 150A is connected to the number 13 pin of multiplexer 134 and also to ground through resistor 197. The float switch input, F, of connector 150A is connected to the number 11 pin of logic/switch 151 through jumper 201 in the fluid sensor module embodiment, and also to the Vbb voltage source through resistor 198. The V and G pins of connector 150A are connected to the Vbb voltage and ground respectively. The number 13 and 15 pins of logic/switch 151 are connected to ground through resistor 191 and also connected to its number 12 pin through resistor 193. The number 12 pin is also connected to the number 14 pin through resistor 192; the number 14 pin is also connected to the number 4 pin of multiplexer 136, to the adjustable input of potentiometer 166, and to the number 4 pin of converter 147 through resistor 190. The number 7 and 8 pins of logic/switch 151 and multiplexer 134 are all grounded, while the number 16 pin of each are connected to the Vbb voltage. The number 3 pins of each are connected to the number 2 pin of converter 147 and the number 5 pin of converter 135. The number 2 pin of multiplexer 134 is connected to the number 6 pin of converter 135 and to the number 3 pin of converter 147. The number 1 pin of converter 147 is connected to ground through resistor 180, the number 5 and 10 pins are grounded and the number 6 pin is connected to the number seven pin through capacitor 171. The number 8 pin of converter 147 is connected to the adjustable input of potentiometer 165 and to pin 13 of converter 135. The other inputs of potentiometer 165 are connected to pins 9 and 10 respectively of converter 135. Pin 13 of converter 135 is also connected to the Vbb voltage through resistor 184 and to ground through capacitor 174. Pin 11 of converter 135 is connected to pin 12 through capacitor 172. Pins 3 and 4 of converter 135 are connected to one side of potentiometer 167 through resistor 183. The other side of potentiometer 167 is connected to ground. The adjustable input of potentiometer 167 is connected to ground. Pins 1 and 8 of converter 135 are also connected to ground. Pin 7 of converter 135 is connected to one side of potentiometer 166, while the other side of the potentiometer is connected to ground through resistor 182.

In the preferred embodiment of the invention multiplexer 134 and logic/analog switch 151 are type CD4051BCN multiplexers, voltage to frequency converter 147 and 135 are type AD537JH V/F converters available from Analog Devices, inverters 152 through 157 are implemented in a single hex inverter type CD4069CN, diodes 161 and 162 are of type IN914's, constant current diode 160 is a type IN5297, potentiometer 165 is a 20K ohm, 15 turn potentiometer 166 is a 10K ohm, 15 turn potentiometer, 167 is a 200K ohm, 15 turn potentiometer, 168, 169 and 170 are 100 ohm, 15 turn potentiometers, capacitors 172, 173, 174, 175 and 176 are 0.01 microfarad, 4700 picofarad, 10 microfarad, 0.1 microfarad and 1 microfarad respectively. Resistors 180 through 198 are 1K ohm, 220K ohm, 60.4K ohm, 909 ohm, 100 ohm, 5K ohm, 270K ohm, 953 ohm, 953 ohm, 953 ohm, 24K ohm, 24K ohm, 24K ohm, 24K ohm, 100K ohm, 10K ohm, 90K ohm, 10 ohm, and 100K ohm respectively. In the preferred embodiment of the sensors of FIG. 12 and 13 the temperature sensors 210, 211, and 212 are type AD590 temperature sensors available from Analog Devices, level sensor 215 is preferably a Metritape TM available from, Meritape, Inc., P.O. Box 2366, Littleton, MA 01460, the float 225, float switch 224, and conducting electrode tips 221 of the fluid sensor of FIG. 13 are a float assembly of the type used with the FD probe series (FD241R, FD 241S, FD241P) available from Pollulert Systems, Inc., P. O. Box 706, Indianapolis, IN 46206-0706 and as described in U.S. Pat. No. 4,442,405 issued to Raymond J. Andrejasich. The conducting electrode tips 217 and 218 are electrodes as described in the foregoing patent, preferably made of platinum, and connectors 150A, 150B and 150C are preferably stake and header connectors while connectors 87A and 87B are preferably 1510D male and female connectors, or both connectors may be hard wired.

Turning now to a summary of the function of the fluid level sensor module of FIGS. 9, 11 and 12 in conjunction with the controller 40 and probe communication system, the fluid level sensor has the principal function of measuring the fluid level in a storage tank such as 39C. It also measures the temperature at three depths along the sensor. Water in the storage tank is detected via conductance electrodes 217 and 218 installed at the bottom of the level sensor module 25C. The liquid level is transduced into an analog signal by the level sensor 215 which may be described as a long variable resistor the submerged part of which is short-circuited by hydrostatic pressure of the liquid in which it is immersed. The temperature sensing is accomplished by two-terminal electronic devices 210, 211 and 212 which conduct current in direct proportion to their absolute or Kelvin temperature. Two reference voltages, V Ref High and V Ref Low, are also measured and reported by the sensor, one near the top and one near the bottom of the analog signal range, these data being necessary to enable the controller 40 to decode the telemetered data. Finally, a signal, V temp, representing the temperature of the electronics package is available for transmission to the controller 40 upon command.

Referring to FIG. 9, an eight-channel analog multiplexer 134 under command of a three-bit digital word from the controller selects one from among an ensemble of eight analog input channels 136 and connects it to the input of voltage to frequency converter 135. The output of converter 135 is a symmetric square wave whose frequency is directly proportional to the analog input voltage. This signal is well suited for transmission through the probe chain to the controller 40, where it is decoded by counting techniques and interpreted with respect to reference signals transmitted through the same chain. Two of the analog input signals to the multiplexer are auxiliary outputs of the converter 135. The signal flow is otherwise straight forward.

Referring to FIGS. 11 and 12, the liquid level sensing circuit consists of a Metritape TM variable resistor 215 excited by a constant current diode 160. The resistance of the level sensor 215, and hence the voltage across it, is proportional to the length of the sensor which is in air. The difference between the air height and the sensor overall height is taken to be the depth of liquid in the storage tank. A 10 ohm reference resistor 197 is inserted between the level sensor 215 and ground. The voltage across this resistor when excited by the 1 ma constant current source is a 10 mV level called low. This is done in preference to using zero volts as a reference level to avoid requiring converter 135 to operate at the extreme of its range.

The temperature sensors 210, 211 and 212 are semiconductor devices which are two-terminal current sources that conduct a current which is proportional to the absolute or Kelvin temperature with a nominal scale factor of 1 microamp per degree Kelvin. For temperature 1, the sensor 210 is read out by converting its current into the voltage across grounded resistor 187. Variable resistor 168 is a scale factor trim which is employed as a single point calibration adjustment. The result is a scale factor of 1 millivolt/degree Kelvin. Temperatures 2 and 3 are read similarly.

The water/hydrocarbon sensor circuit consists of a multivibrator, an alternating-current conductance-sensing circuit, and a half-wave rectifier and filter circuit. A conventional CMOS free-running multivibrator is formed by inverters 152 and 153, resistor 181, and capacitor 173. A square wave at about 500Hz is present at the output of inverter 153. When the conducting tips 217 and 218 are in air or oil, capacitor 175 is effectively not in the circuit and the square wave appears at the input of inverter 154 and the output of inverter 155. Diode 162 and capacitor 176 form a peak detector which is discharged by resistor 194. When the square wave is present at the output of inverter 155, a high level is present at the input of inverter 156 and hence at the output of inverter 157. When water is present between the conducting tips 217 and 218 capacitor 175 is effectively connected to ground and the voltage at the input of inverter 154 does not have time to rise significantly from the low level to which it is set by the conduction of diode 161; that is, there is insufficient current flow through resistor 186 to charge capacitor 175 during the positive half period of the multivibrator. In effect, the square wave is shorted to ground by capacitor 175 and the water conductance across the conducting tips 217 and 218. Accordingly, diode 162 does not conduct and a low level obtains at the input of inverter 156 and at the output of inverter 157, the latter of which constitutes the logic signal which indicates that water is present. The circuit output switches sharply at a conducting tip resistance of about 150K ohm. The threshold resistance can be increased by increasing the value of resistor 186.

An eight channel analog multiplexer integrated circuit 134 suffices for the level sensor, though the other multiplexer 151 is available if expansion to more channels is desired. The outputs (pin 3) of the multiplexers 134 and 151 are hardwired together because a high level on the inhibit line (pin 6) of the deselected chip places all of its analog switches in the high impedance state.

The voltage to frequency converter integrated circuit 135 produces a square wave logic signal output having a frequency that is proportional to the analog input signal voltage with a nominal scale factor of 10K Hertz-/volt. As used in this circuit, the input impedance seen by the analog input source is about 250 megohms, with an input bias current of 100 na. Therefore, errors due to loading and input current are less than 0.1% and are thus negligible. In order to secure the maximum dynamic range of which the converter 135 is capable, it is necessary to null the input amplifier. This is accomplished with potentiometer 165.

The scaling equation relating output frequency to input signal voltage in this circuit is: F out=Vin/10 (resistance 183+resistance 167)×capacitance 172. Potentiometer 167 is used to adjust the scale factor. The V/F converter 135 provides the voltage reference output on pin 7 which is specified as 1 volt ±5%. Potentiometer 166 is used to create a precise 900mV ±1mV reference called Vref high, which is connected to the multiplexer 134 at pin 4.

Another output signal from the converter 135 is a thermometer output representing the chip absolute temperature with a scale factor of 1mV/°K±2%. The initial calibration is specified as raiseline accurate within ±5 Kelvin degrees at room temperature. This reference output is connected to the multiplexer 134 at pin 2 and is used to indicate the temperature of the sensor module electronics package. This temperature may be used by the processor 90 to correct the received VCO frequency as indicated in the manufacturers specifications that accompany the VCO chip. Such temperature corrections are not necessary, of course, if the voltage levels applied to the VCO are spaced more widely than the changes in frequency due to temperature and/or the probe temperature is relatively stable.

Turning now to a summary of the function of the fluid sensor module of FIGS. 10, 11 and 13 in conjunction with the controller 40 and the probe communication system; the purpose of the fluid sensor module 149 is to detect the presence of liquid and determine whether the liquid is hydrocarbon or water. A float switch 224 detects that liquid is present; an electrical conductance circuit 140 discriminates between hydrocarbon and water. These two inputs to a logic circuit 142 determine which of three analog levels is presented to voltage-to-frequency-converter 147. The resulting one of three frequencies is transmitted through the probe chain to the controller 40 to be decoded by a counting technique. Referring to the block diagram in FIG. 10, a water/hydrocarbon sensor 140 gives a logic signal which is high when electrical resistivity between conducting tips 221 and 222 is above a threshold value (about 150K ohm) and low when the resistivity is below the threshold. Thus a low output signifies that water is present between the tips. The float switch 224 generates a logic signal signifying that floatation has occurred. A logic circuit processes these two inputs and controls an analog switch 143 to connect one of three analog levels generated by voltage divider 144 to multiplexer 134. Input signals from the controller 40 control the analog channel selected by the multiplexer 134. In the fluid sensor 149, four multiplexer channels 146 are utilized; they are: air-oil-water signal, reference voltage (nominal 1 volt); zero volt reference; and thermometer output signal. Converter 147 generates a symmetric square wave of a frequency which is directly proportional to the analog voltage output of multiplexer 134. This square wave signal is suitable for transmission thru the Communication module chain to the processor in the controller 40. The proportionality constant is nominally 10K Hertz/volt. Two analog output signals are also generated by the converter 147: a one-volt reference level which is used to drive voltage divider 144; a thermometer signal which is directly proportional to the absolute (Kelvin) temperature of the converter integrated circuit chip 147, and which has a proportionality constant of 1 millivolt/degree Kelvin. The latter signal is used to monitor the temperature of the fluid sensor electronics package. Referring to FIG. 11, because of commonality of function, both the fluid sensor 149 and the level sensor 139 are constructed on the same printed circuit board by suitable inclusion or omission of components and suitable placement of three jumper connections 201, 202 and 203. The curved dashed lines on the schematic diagram indicate the required jumper connections for the fluid sensor 149; the solid curved lines are the jumpers for the level sensor 139. The water/hydrocarbon sensor circuit 140 operates as described above in the discussion of the level sensor 139 to produce a logic signal at the output of inverter 157 which is applied to pin 10 of logic/switch 151 in the fluid sensor embodiment.

The float switch 224 is a magnetically actuated single-pole single-throw switch which is connected to the grounded electrode tip 221 in the float assembly 225 when no liquid is present. Flotation causes the float switch 224 to open. The switch is connected to Vbb through resistor 198 and, via the dashed jumper 201, to pin 11 of logic/switch 151, a channel select input. Hence flotation causes a high level at pin 11. The output of the water/hydrocarbon sensor circuit connects via dashed jumper 202 to pin 10, another channel select input of logic/switch 151. Pin 9 of logic/switch 151 is held low by software commands from the controller 40. Integrated circuit logic/switch 151 is a multiplexer chip which is used in the fluid sensor both as logic circuit 142 and as multipole analog switch 143. Its channel select inputs are exploited for their ability to do simple logic on two binary input signals and express the result by selecting one from the ensemble of analog input signals connected to the channel inputs. The voltage divider circuit 144 provides voltage levels of 0.75, 0.5 and 0.25 volts to pins 14, 12, 13 and 15 respectively of logic/switch 151. The logic is such as to produce the relationship codified in Table 1 between conditions and analog voltages at the output, pin 3 of logic/switch 151.

TABLE 1

| Condition | Logic Input pin 11 | Logic Input pin 10 | Analog Switch Output pin 3 | Frequency of VF Converter Output pin 9 |
| --- | --- | --- | --- | --- |
| Air | Low | High | .25 volt | 2048 Hz |
| Oil | High | High | .5 | 4096 Hz |
| Water | High | Low | .75 | 6144 Hz |

The output of pin 3 is applied as the analog input signal to voltage to frequency converter 147, pin 2. Output frequencies as shown in Table 1 are produce in response to the detected conditions. Note that the output pins 3 of the two multiplexer chips 151 and 134 are hardwired together; this is feasible because the inhibit input, pin 6, is under software control. When the inhibit input is high all analog switches go to the high impedance state. Converter 147 also provides a reference voltage of 1.0 volt on its pin 4 which is used to drive the voltage divider 144 and is connected to multiplexer 134, pin 4, so that it may be monitored by the controller 40. Converter 147 also produces a thermometer output signal on its pin 3 which is an analog signal proportional to the absolute or Kelvin temperature of the V/F chip with a scale factor of 1mV/°K. This signal also connects to multiplexer 134 at pin 2. The scale factor of the converter 147 is set by capacitor 171 and resistor 180 according to the relation: $F = V/10 \times \text{resistance } 180 \times \text{capacitance } 171$, with the values shown, the scale factor is 10KHz/volt. Note that capacitor 171 should be mounted close to the pins to which it connects to avoid errors due to pickup and stray capacitance.

Summarizing the function of the invention, the controller 40 transmits a command down the cable 30 to the probes 20 through 29. Optocouplers, such as 54, 64 and 65, are used to isolate the probes from one another and from the controller 40. The command word is received by optocoupler 64 in probe 20, converted to a TTL (transistor-transistor logic) level signal and passed to the decoder 77 serial input. The D1–D15 inputs of decoder 77 are the local address inputs and are set to zero. The serial output (SO) of the decoder 77 is connected to the serial input (D) of shift register 78 and through the Q7 output of shift register 78 to the serial input of shift register 79. The output of shift registers 78 and 79 is the decoded 16-bit command word. The data word portion of the command word is passed to both the encoder 62 and the sensor module terminal block 87. The identifier signal address outputs from the shift register 79 are applied to the A inputs of 5-bit adders 80 and 81. The B inputs are connected to Vbb (logic 1). The net effect is that the adder output is one less than the input probe identifier signal address. The new probe identifier signal address is applied to the data inputs of encoder 62. If the command word is valid, the Data Valid flag of decoder 77 is set high. The signal is applied to the SDI line of encoder 62 which causes the encoder to start transmission of the modified command word down the cable 30 to the next probe 21. If the received probe identifier signal address is zero, the SEL line of decoder 77 rises. This causes switch 63 to select the local status signal instead of the signal coming from the next probe (21).

If the identifier signal is not zero, then at the next probe 21 the process just described is repeated and the identifier signal is passed down the series of probes on cable 30 until it is decremented to zero and a probe responds with its local status signal, which signal is passed back to the controller 40 as described above.

It is noted that in the preferred embodiment the communication module does not specify how the data word is to be used, but simply passes it on the sensor module. It also does not specify what the signal on the status signal input should be, but simply passes it on. The only requirement placed on these signals is that they are TTL compatible. However, it is contemplated that in other embodiments the selection of signals to be transmitted could be made in whole or in part in the communication module.

It is also noted that the nature of the command signal from the controller 40 is not specified except that it be a TTL signal that provides the information to identify the particular probe to be communicated to and the channels to be selected. For example, some other form of determining signal validity may be used other than the Machester encoding, provided that the Manchester decoders (77) used in the probes be replaced with other suitable decoders.

A feature of the invention is the fact that the electronics is simpler than prior art systems, yet permits more flexibility and detection power. It is noted that all probe communication modules may be made identical, which simplifies the manufacturing process, the installation process and maintenance process. It also allows the probes to be totally sealed at manufacture. Since the probes are necessarily placed in locations where water and other fluids may be present and the units may be immersed in water or other liquids for long periods, such ability to seal the probes is highly desirable.

Another feature of the invention is that many different sensors can be employed with essentially the same system. Using the multiplexer 134, the controller can control the sensor signal as desired so that it is compatible with the input the controller is set up to receive at the time. This eliminates using special requirements as to signal formation and level that were required in prior art systems.

A novel fluid status detector system has been described which permits a wide variety of probes and sensors to be employed in a single system and has many other advantages. It is evident that those skilled in the art may now make many uses and modifications of the specific embodiment described without departing from the inventive concepts. For example, many of the probe parts may be replaced by a microprocessor and the functions described may be software implemented. Consequently, the invention is to be construed as embracing each and every novel feature and novel combination of features present in the fluid status detector system described.

What is claimed is:

1. A fluid status detection system comprising:
   a controller, a plurality of probes for sensing the status of fluids at probe locations remote from the controller, and a transmission line connecting said controller and said probes, wherein said controller comprises: a controller output, a controller input, means for providing a command signal to said controller output and a means responsive to signals received at said controller input for providing an indication of said fluid status at said probe locations;

said probes each comprising: sensing means for providing a plurality of status signals representative of one or more fluid conditions and for applying said status signals to a plurality of probe data channels, a probe input, and a probe output;

said transmission line connecting said controller output to said probe input and said controller input to said probe output, wherein said command signal comprises a probe identifier signal representative of a particular one of said probes and a probe data signal representative of a particular one of said probe data channels; and wherein each of said probes further comprises: means for storing a local probe address; means for comparing said probe identifier signal to said local probe address, selecting means responsive to said data signal for selecting one of said data channels, and means communicating with said means for comparing for providing a signal corresponding to the signal on said selected data channel to said probe output when said identifier signal correlates with said local probe address.

2. The fluid detector of claim 1 wherein said plurality of probes comprises a first probe including a first sensing means for sensing one or more first fluid conditions and a second probe including a second sensing means for sensing one or more second fluid conditions, at least one of said second fluid conditions being a different condition than any of the conditions sensed by said first sensing means.

3. The fluid detector of claim 2 wherein said first sensing means includes a fluid level sensor, and said second sensing means includes a liquid-gas sensor.

4. The fluid detector of claim 3 wherein said first sensing means includes a plurality of temperature sensors.

5. The fluid detector of claim 4 wherein said first sensing means includes a water-hydrocarbon sensor.

6. The fluid detector of claim 1 wherein said selecting means comprises a multiplexer.

* * * * *